US011101727B1

(12) United States Patent
Sharma et al.

(10) Patent No.: US 11,101,727 B1
(45) Date of Patent: Aug. 24, 2021

(54) OUT OF AUDIO SWITCHING FOR POWER SUPPLY

(71) Applicant: TEXAS INSTRUMENTS INCORPORATED, Dallas, TX (US)

(72) Inventors: Anmol Sharma, Freising (DE); Thomas Keller, Attenkirchen (DE); Gerhard Thiele, Dachau (DE)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 16/790,218

(22) Filed: Feb. 13, 2020

(51) Int. Cl.
*H02M 1/08* (2006.01)
*H02M 3/158* (2006.01)
*H02M 3/156* (2006.01)

(52) U.S. Cl.
CPC .............. *H02M 1/08* (2013.01); *H02M 3/158* (2013.01); *H02M 3/156* (2013.01)

(58) Field of Classification Search
CPC . H02M 2001/0003; H02M 2001/0006; H02M 2001/0041; H02M 1/08; H02M 1/0088; H02M 1/32; H02M 1/36; H02M 3/156; H02M 3/1563; H02M 3/158
See application file for complete search history.

(56) References Cited

U.S. PATENT DOCUMENTS 6,614,310 B2 *  9/2003  Quarfoot ................. H03F 1/025
                                                          330/136
6,859,020 B2 *  2/2005  Baldwin ............. H02M 3/1588
                                                          323/283
9,621,028 B2 *  4/2017  Lin ....................... H02M 1/4225
2008/0084723 A1   4/2008  Balakrishnan et al.
2012/0051100 A1   3/2012  Alexander
2012/0250378 A1  10/2012  Kok et al.
(Continued)

FOREIGN PATENT DOCUMENTS

EP            3185420 A2 *  6/2017  ............. H03K 17/08
WO    WO-2017208668 A1 * 12/2017  ......... G01R 31/2619

OTHER PUBLICATIONS

Min-Sung Kim, et al., "Advanced Burst Mode Control to Reduce the Standby Power of Flyback Converter"; Engineering, 2013, 5, 137-141doi:10.4236/eng.2013.51b025, Published Online Jan. 2013 (http://www.SciRP.org/journal/eng); 5 pgs.
(Continued)

*Primary Examiner* — Matthew V Nguyen
(74) *Attorney, Agent, or Firm* — Mark Allen Valetti; Charles A. Brill; Frank D. Cimino

(57) ABSTRACT

A power converter includes a watchdog circuit having an input adapted to be coupled to a pause signal of a switching power supply. The watchdog circuit is configured to provide a start signal at an output thereof based on the pause signal indicating that the power converter has stopped switching for a threshold duration that is less than an audible range. A pulse generator circuit has an input coupled to the output of the watchdog circuit and is configured to generate at least one pulse based on the start signal. A switch circuit has an input terminal adapted to be coupled to an input voltage and at least one other terminal adapted to be coupled to an inductor. The switch circuit is configured to provide negative current from an output of the power converter through the at least one other terminal based on the at least one pulse.

22 Claims, 11 Drawing Sheets

(56) References Cited

U.S. PATENT DOCUMENTS

| | | | |
|---|---|---|---|
| 2013/0208520 A1* | 8/2013 | Michishita | H02M 3/156 363/84 |
| 2013/0336020 A1 | 12/2013 | Balakrishnan et al. | |
| 2017/0250613 A1 | 8/2017 | Balakrishnan et al. | |

OTHER PUBLICATIONS

Data Sheet entitled "NCP1027 High-Voltage Switcher for Medium Power Offline SMPS Featuring Low Standby Power"; Semiconductor Components Industries, LLC; Jan. 2015; 30 pgs.

Data Sheet entitled "TPS63810 and TPS63811-2.5—A Buck-Boost Converts with I2C Interface"; Texas Instruments Incorporated, Jul. 2019—Revised Nov. 2019; 44 pgs.

PCT Search Report for International PCT Application No. 2021016004, dated Apr. 29, 2021.

\* cited by examiner

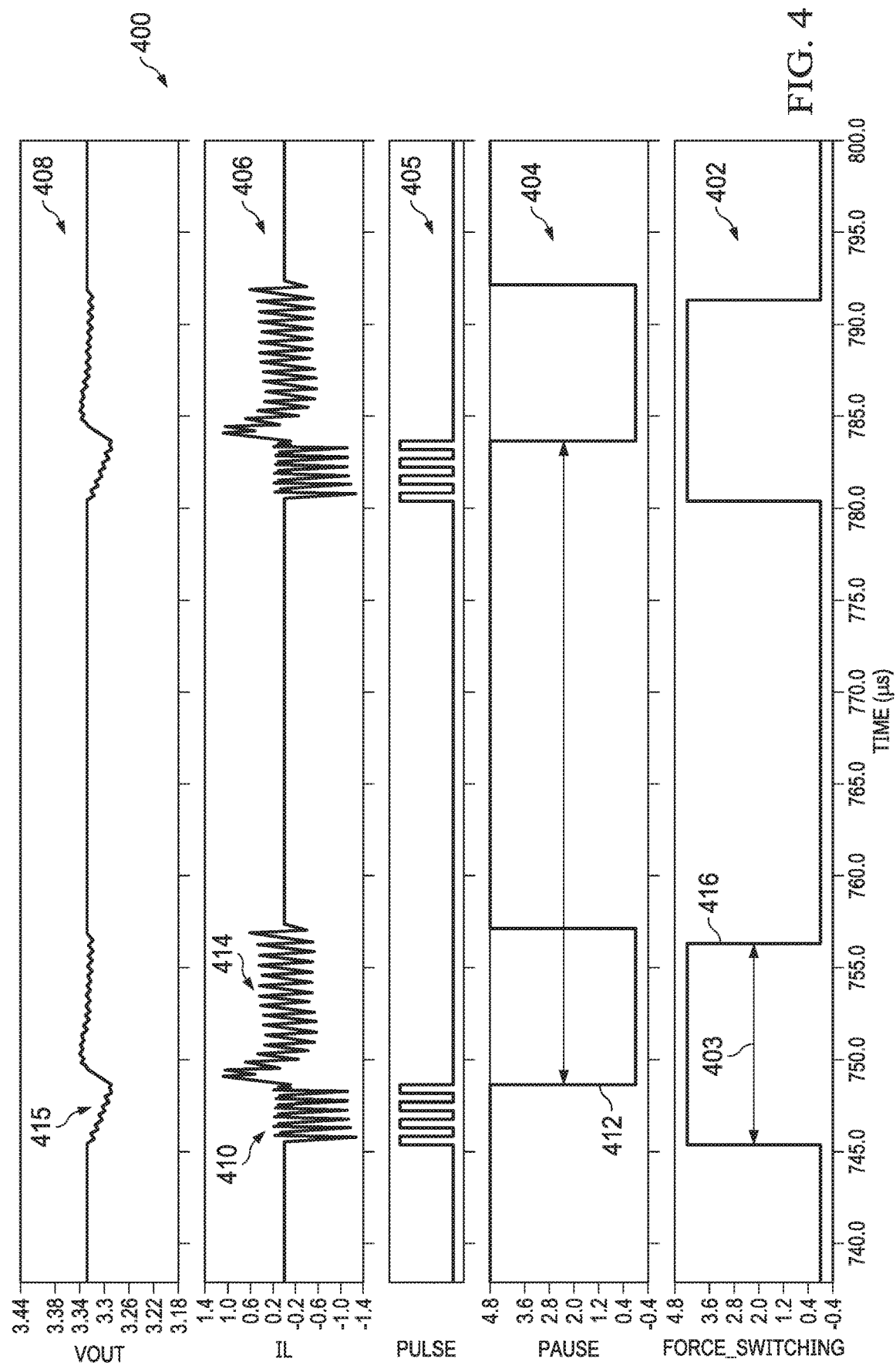

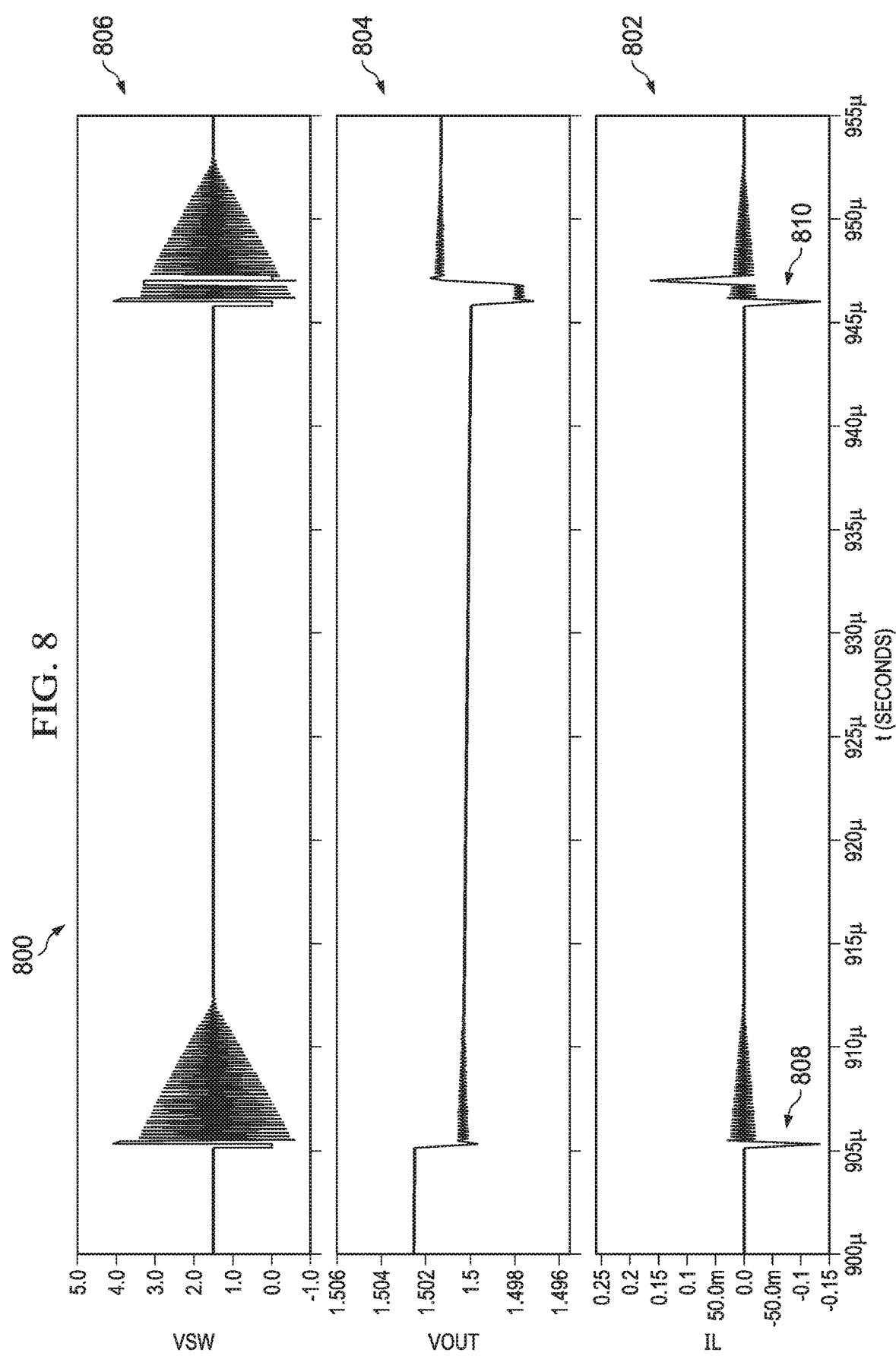

OUT OF AUDIO SWITCHING FOR POWER SUPPLY

TECHNICAL FIELD

This disclosure relates generally to implementing out of audio switching for a power supply.

BACKGROUND

Examples of power supply circuits include synchronous rectifier power converters, asynchronous rectifier power converters, resonant power converters, and any of a variety of other types of switching power converters. Power converter and power supply devices often operate through a power saving mode such as when there is little or no load applied to an output. In these situations, switch devices may operate in bursts of switching activity separated by periods when the device does not switch. If the repetition rate for such bursts exceeds a certain duration (e.g., an audio duration), the switching bursts may be rendered audible, which is undesirable in many applications.

SUMMARY

One example includes a power converter includes a watchdog circuit having an input adapted to be coupled to a pause signal of a switching power supply. The watchdog circuit is configured to provide a start signal at an output thereof based on the pause signal indicating that the power converter has stopped switching for a threshold duration that is less than an audible range. A pulse generator circuit has an input coupled to the output of the watchdog circuit and is configured to generate at least one pulse based on the start signal. A switch circuit has an input terminal adapted to be coupled to an input voltage and at least one other terminal adapted to be coupled to an inductor. The switch circuit is configured to provide negative current from an output of the power converter through the at least one other terminal based on the at least one pulse.

Another example provides a system that includes a switch circuit having an input terminal and an output terminal. The input terminal coupled to an input voltage and the output terminal coupled to an output voltage of the system. Main control loop circuitry is configured to control the switch circuit in a pulse width modulation (PWM) mode to regulate the output voltage relative to a target voltage. Auxiliary control loop circuitry is configured to control the switch circuit to provide negative current in response to operating in a skip mode, when switching is paused, for a threshold duration, which is less than a duration to operate the switch circuit in an audible range. The negative current is to flow from the output terminal through an inductor to discharge the output voltage. The main control loop circuitry is configured to transition from the skip mode to the PWM mode based on the output voltage and the target voltage to maintain operation of the switch circuit out of the audible range.

As yet another example, a method includes receiving a pause signal having a state indicating operation in a skip mode in which a switch circuit of a power converter has stopped switching in a pulse width modulation (PWM) mode. The method includes providing a start signal based on the pause signal in response to detecting that the switch circuit has stopped switching for a threshold duration. The method includes generating at least one pulse during the skip mode based on the start signal. The method includes providing negative current from an output of the power converter through an inductor based on the at least one pulse. The method includes discharging an output voltage at the output of the power converter based on the burst of negative current. The method includes transitioning from the skip mode to the PWM mode based on the output voltage and a target voltage to maintain operation of the switch circuit out of an audible range.

BRIEF DESCRIPTION OF THE DRAWINGS

FIG. 4 is a signal diagram for the control loop of FIG. 3.

FIG. 8 is a signal diagram illustrating signals associated with control of the circuit of FIG. 7A during out-of-audio switching.

DETAILED DESCRIPTION

Figure 1:
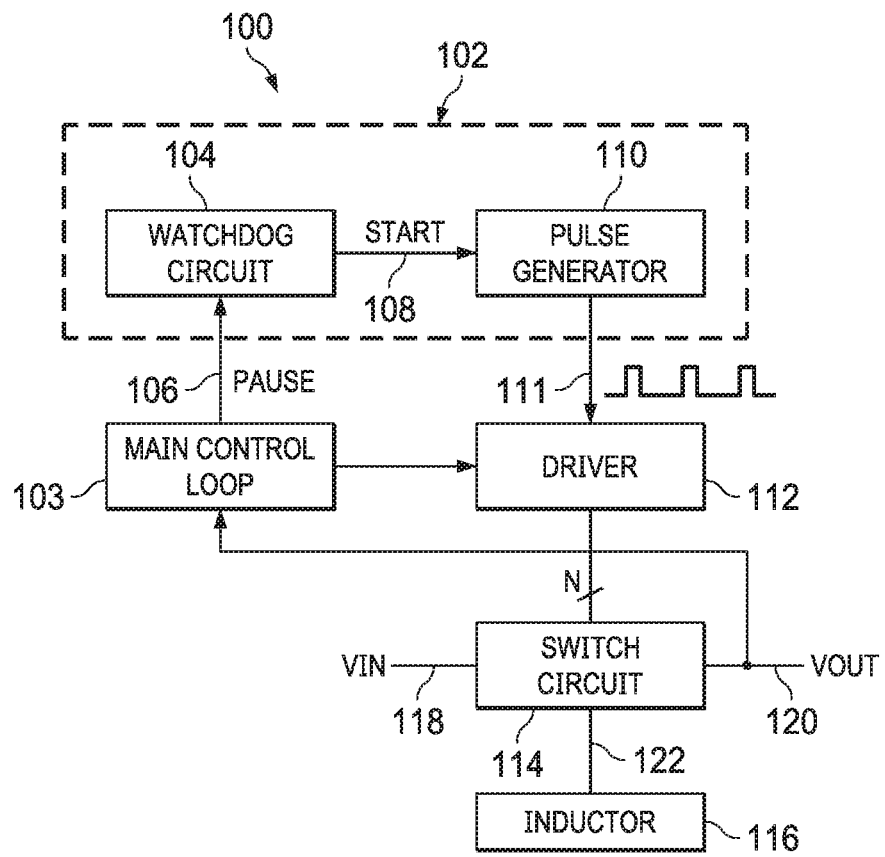
FIG. 1 is a block diagram illustrating an example control loop to this audio switching.

This disclosure relates to an out-of-audio control scheme for a power converter, such as a switching power supply. The out-of-audio control is configured to implement switching in bursts that occur intermittently at a time interval that is out of an audible range. For example, an out-of-audio switching control loop is configured to provide a burst of negative current (e.g., one or more negative current pulses) through an inductor during a skip mode in which the device does not switch. The negative current flows from an output of a power converter through an inductor to discharge the output voltage based on the negative current. This inductive discharge of the output voltage allows the skip mode, in which the device does not switch, to be exited naturally without a need to prematurely force a pulse width modulation (PWM) mode of operation to maintain out-of-audio operation. That is, the negative inductor current discharges the output voltage to cause a natural transition from the skip mode to an active switching mode by the main control loop to regulate the output voltage based on the output voltage falling below a target voltage. Because the output voltage is discharged in this way, the control also prevents net positive energy from accumulating on an output capacitor at the output of the converter, which avoids runaway that may occur in other approaches that force a PWM mode to implement out-of-audio operation.

As an example, a power converter (e.g., a buck converter, a boost converter or a buck-boost converter) includes a main control loop that is configured to regulate an output voltage to a target voltage. The power converter also includes an out-of-audio control loop configured to provide bursts of negative current for discharging the output voltage through the inductor at a frequency that is out of an audible range. For example, the out-of-audio control loop includes a watchdog circuit having an input adapted to be receive a pause signal of the power converter. For example, the pause signal is set high when the converter switch circuit has stopped switching and is operating in a skip mode and is set low during switching in a PWM operating mode. The watchdog circuit monitors the skip duration (e.g., beginning when the pause signal is asserted) to ensure that the burst switching frequency remains out of the audible range, such as a frequency of at least about 20 kHz (corresponding to a period of 50 microseconds or less). In response watchdog circuit detecting that the pause signal is high for a threshold duration (e.g., about 40 microseconds or less), the watchdog circuit provides a start signal. A pulse generator circuit is configured to generate one or more pulses based on the start signal. The one or more pulses are utilized to generate the burst of negative current for discharging the output voltage. For example, the pulse generator supplies the one or more pulses to a driver circuit that is configured to control the converter switch circuit to provide the negative current through the inductor.

In an example where the switch circuit is implemented by field effect transistors (FETs), the negative current automatically returns to the input voltage through a back-gate diode of a respective FET when the switches are turned off following a negative burst through the inductor. As the output voltage falls below the target voltage, the main control loop of the power converter enters a PWM mode to control the switch circuit (through PWM switching) for regulating the output voltage with respect to the target voltage. The main control loop terminates the switching of the switch circuit based on the output voltage being regulated and the power converter again enters the skip mode, in which the pause signal goes high. This control process, which is implemented by the main and auxiliary control loops during low or no load conditions, can be implemented to keep the periodic switching bursts out of the audible range.

Advantageously, because the out-of-audio control loop applies negative current bursts to discharge the output voltage prior to supplying positive pulses, the out-of-audio control loop ensures that the output voltage cannot run away, such as by repeatedly charging an output capacitor. Additionally, because energy is first inductively discharged from the output voltage and returned to the input voltage, the approach disclosed herein can operate with increased power efficiency compared to many existing approaches. For example, one existing approach is to maintain a nominal load on the output during a power saving mode such as when low or no load is externally applied. Such an approach, however, results in continuous dissipation of energy. Another existing approach is to force switching at a fixed rate, which may be out of an audible range. This other existing approach, however, can result in runaway because forcing of switching could increase the output voltage well above the target voltage.

As used herein, the term "circuit" can include a collection of active and/or passive elements that perform a circuit function, such as an analog circuit and/or digital circuit. Additionally or alternatively, for example, the term "circuit" can include an integrated circuit (IC) where all or some of the circuit elements are fabricated on a common substrate (e.g., semiconductor substrate, such as a die or chip) or within a common package herein. For example, circuitry of a power converter (e.g., the control loops, switch circuits, drivers and the like) may be implemented in an IC chip.

Additionally, the term "couple" is used throughout the specification. The term may cover connections, communications, or signal paths that enable a functional relationship consistent with the description of the present disclosure. For example, if device A generates a signal to control device B to perform an action, in a first example device A is coupled to device B, or in a second example device A is coupled to device B through intervening component C if intervening component C does not substantially alter the functional relationship between device A and device B such that device B is controlled by device A via the control signal generated by device A.

FIG. 1 is a block diagram of part of a power converter 100 that includes an auxiliary control loop 102 configured to implement out-of-audio control for the power converter. The auxiliary control loop 102 may be implemented by analog circuits, digital circuits or a combination of analog and digital circuitry. The power converter 100 also includes a main control loop 103 configured to regulate an output voltage VOUT of power converter according to a target voltage. While the auxiliary control loop 102 is demonstrated in FIG. 1 as being separate from the main control loop 103, in another example, the auxiliary control loop 102 could be part of (e.g., integrated into) the main control loop 103.

In the example of FIG. 1, the auxiliary control loop 102 includes a watchdog circuit 104 having an input 106 that is adapted to receive a PAUSE signal of the power converter 100. For example, the PAUSE signal is a binary signal generated by a main control loop 103 of the power converter 100, such as to specify that an associated switch circuit 114 has stopped switching and the converter 100 is operating in a skip mode (e.g., a non-switching, skip state). The skip mode corresponds to a sustained period of deactivation of the power switch(es) of the switch circuit 114. When the switches are deactivated during the skip mode, such as during light or no load conditions, the amplitude of the output voltage VOUT is set based on an output capacitor that is coupled to the output 120. In an example, the PAUSE signal is high during the skip mode and low during a switching (e.g., PWM) mode. The PWM mode corresponds to sequential on-time and off-time of the power switch(es) of the switch circuit 114, such as supply current to the output 120 during normal load operation of the power converter 100. If left alone, the charge held by output capacitor may discharge due to light loads or through leakage. The watchdog circuit 104 is configured to provide the start signal at 108 in response to detecting the PAUSE signal has been high (e.g., corresponding to operating in the skip mode) for a threshold duration. As an example, the threshold duration used to trigger the negative current burst, which may be fixed or programmable, is set to a time period sufficient (e.g., 40 microseconds or more) to enable the auxiliary control loop 102 to control the power converter 100 at a frequency that is out of the audible range.

In the example of FIG. 1, the watchdog circuit 104 is configured to provide a start signal at an output 108 to instruct a pulse generator circuit 110 to initiate a burst. The start signal at 108 thus is utilized to force switching of the switch circuit 114 that is otherwise disabled during the skip mode. The pulse generator circuit 110 is configured to generate one or more pulses in response to the start signal from the watchdog circuit 104. In an example, the pulse generator 110 is configured to provide a fixed number of one or more pulses based on the start signal. In another example, the pulse generator is configured to provide a variable number of pulses based on the start signal. The number of pulses may vary depending upon the level of the output voltage at the time of the start signal. Alternatively, the number of pulses may be programmed in response to a user input (e.g., saving the value in a register). As another example, the pulse generator is configured to control the number and/or width of pulses based on the output voltage VOUT of the power supply relative to a target output voltage. For example, a difference between the output voltage and the target voltage (e.g., corresponding to an error signal) may be utilized to control pulses suppled for each period of the skip mode.

As shown in the example of FIG. 1, the pulse generator supplies the one or more pulses to a driver circuit 112. The driver circuit 112 has an output coupled a control input of each respective switch device of the switch circuit 114. The switch circuit 114 can include any number of N switch devices (e.g., field effect transistors or bipolar transistors) depending upon the type of power converter being implemented. The switch circuit 114 of the power converter 100 includes an input 118 electrically coupled to an input voltage $V_{IN}$ and an output 120 coupled to an output voltage VOUT. An inductor 116 is also coupled to the switch circuit 114, such as through one or more inductor terminals 122. The particular arrangement and connections between the switch circuit 114 and the $V_{IN}$ and VOUT as well as the inductor 116 can vary depending upon the type of power converter being implemented.

The switch circuit 114 is configured to provide a burst of negative current from the output 120 through terminal 122 and the inductor 116 based on the one or more pulses provided by the pulse generator at 111. The negative burst of current inductively discharges the output voltage VOUT until the output falls below the threshold and the main control loop 103 resumes operation of the power converter 100. For example, the main control loop 103 can provide control signals to the driver circuit 112 to operate the switch circuit 114 for supplying positive current from the input 118 through the inductor 116 and to the output 120 as to increase the output voltage according to a target voltage. The manner of control may be a forced PWM mode or a ramp PWM mode, which may vary depending upon application requirements.

By triggering the pulse generator 110 to cause the switch circuit 114 to provide a negative burst at a frequency that is out of the audible range of the power converter, of the power converter can operate in a manner that is free of audio that may otherwise be distracting to the user. The negative current that is provided further improves energy efficiency over existing approaches, such as disclosed herein, as well as does not require periodic forcing of PWM to achieve out-of-audio operation.

Figure 2:
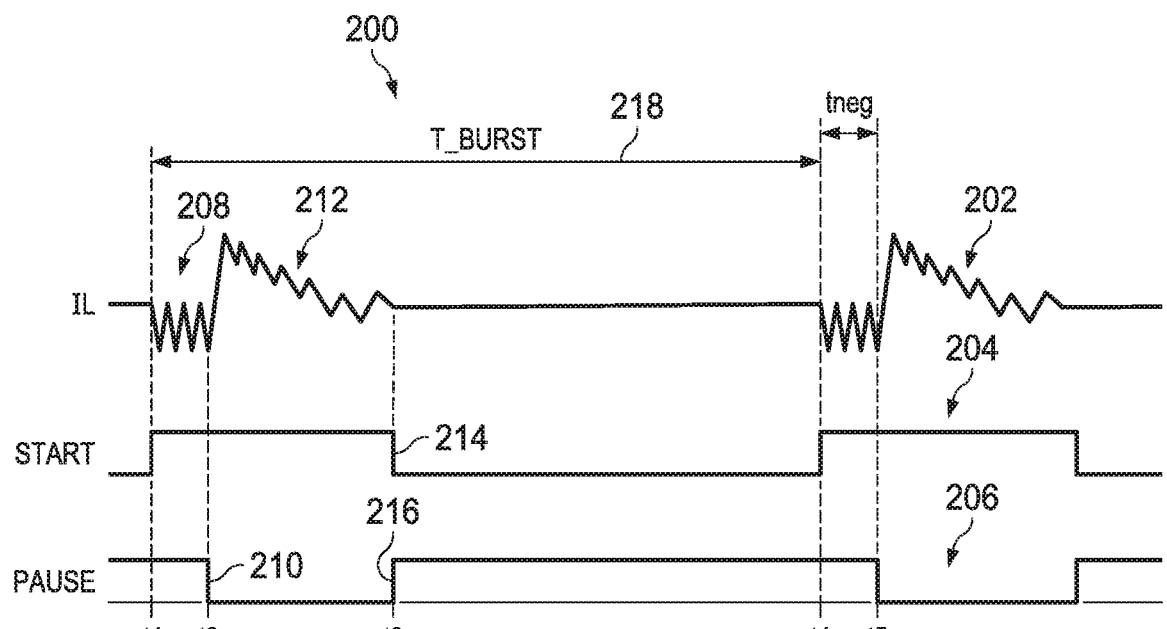
FIG. 2 is a signal diagram illustrating operation of the control loop of FIG. 1 for reducing out-of-audio switching.

FIG. 2 is a signal diagram 200 demonstrating an example of signals in the power converter 100 of FIG. 1. The diagram 200 includes inductor current 202 corresponding to current through the inductor 116 and the terminal 122 of FIG. 1. FIG. 2 also shows a start signal 204 corresponding to the signal at the output 108 of the watchdog circuit 104. The diagram 200 also depicts a PAUSE signal 206. As demonstrated in the example of FIG. 2, in response to the start signal 204 going high (e.g., at t1 and t4), a negative burst of inductor current 208 is provided (e.g., through the inductor 116) in response to a series of pulses (e.g., pulses 111 provided by the pulse generator 110). The negative burst of inductor current 208 has a duration demonstrated at tneg. As disclosed herein, the negative burst of inductor current 208 results in the decreasing of the output voltage. In response to decreasing output voltage below the target voltage, the PAUSE signal 206 goes low (at time t2) as demonstrated at 210. At this time t2, due to the output voltage decreasing below the target voltage, the main control loop takes over the power converter, such as by entering a PWM mode and providing a positive burst of inductor current, demonstrated at 212, until the output voltage is regulated (at time t3) and switching stops. When switching stops (at time t3), the PAUSE signal goes, demonstrated at 216.

By way of example, the transition between the negative burst 208 and the subsequent burst of positive inductor current 212 (e.g., at time t2) may be controlled by the main control loop regulating the output voltage in a PWM mode. The positive inductor current 212 thus increases the output by accumulating charge in an output capacitor (e.g., coupled to output 120) based on control loop regulating the output voltage VOUT to a target voltage. When the output voltage VOUT has been regulated to the desired target, the start signal 204 goes low, as indicated at 214, and the PAUSE signal 206 goes high at 216. For example, in response to the PAUSE signal going high at 216, the watchdog circuit 104 activates a timer to ensure that the switching is not stopped for a time period that exceeds the audible time period (e.g., about 50 microseconds or more). In this way, the auxiliary control loop 102 operates to ensure that the period between switching bursts 218 is less than the threshold duration that, if exceeded, could result in audible switching of the power converter. As disclosed herein, the negative bursts at the beginning of each burst cycle ensure that the output voltage VOUT does not runaway do to accumulating charge on an output capacitor. Because the negative bursts discharge the output voltage, the approach disclosed herein also allows the main control loop to exit skip mode naturally, and without forcing the converter into a forced-PWM mode.

Figure 3:
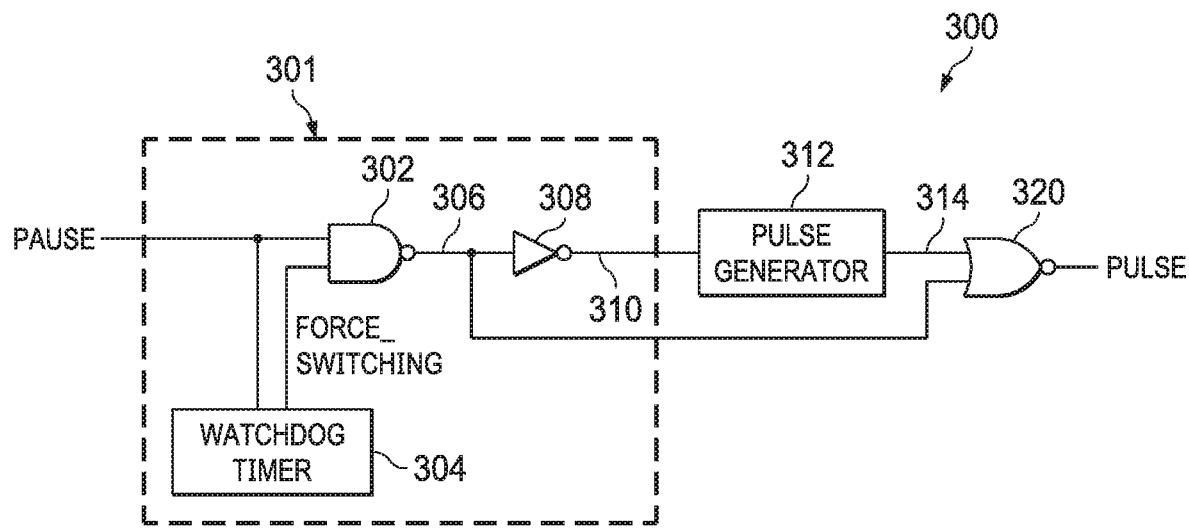
FIG. 3 is another example of a control loop for implementing out-of-audio switching.

FIG. 3 depicts example of an auxiliary control loop 300, which may be used for implementing the control loop 102 of FIG. 1. The auxiliary control loop 300 includes a watchdog circuit 301 having an input that is adapted to receive a PAUSE signal, such as the pause signal 106 from the main control loop 103 as shown in FIG. 1. As disclosed herein, the PAUSE signal can indicate whether or not the switch circuit of the power converter is switching. For example, control logic of the main control loop provides the PAUSE signal based on the output voltage relative to a target voltage (e.g., an error amplifier of the main control loop comparing the output voltage to the target voltage). When the PAUSE signal is high, it indicates that the power converter is in a skip mode in which the switch circuitry is temporarily not switching. For example, during a zero or light load condition, when the output voltage VOUT is at or above the target, the main control loop can enter the skip mode and discontinue switching for a period of time while in the skip mode.

The PAUSE signal is provided to an input at an NAND-gate 302 as well as to a watchdog timer 304. The watchdog timer 304 may be implemented as an analog timer circuit or digital timer circuit.

The watchdog timer 304 is configured to provide a FORCE_SWITCHING signal to another input of the NAND-GATE 302. For example, the watchdog timer 304 is set to ensure that the skip mode does not continue for a threshold duration that will allow the power converter to enter the audible range. The watchdog timer 304 thus provides the FORCE_SWITCHING signal to indicate that a threshold duration has lapsed from when the PAUSE signal was asserted (e.g., a duration of about 40 microseconds after PAUSE signal going high) and to enable switching by the switch circuit as disclosed herein while PAUSE signal remains high. The time interval implemented by the watchdog timer 304 may be predetermined or programmable. For example, the time interval is set according to a configuration of components in analog circuitry used to implement the watchdog timer, and different components can result in different intervals. In another example, the time interval can be set as a value (e.g., a counter or timer value) provided to digital circuitry used to implement the watchdog timer 304. The NAND-gate 302 thus performs a logical NAND operation and provides a resulting start signal at 306 to an input of an inverter 308. The inverter thus supplies an inverted version of the start signal at 310 corresponding to an input of a pulse generator 312.

For example, the pulse generator 312 corresponds to the pulse generator 110 of FIG. 1. The pulse generator 312 is configured to provide a series of one or more pulses. For example, the pulses may be a fixed number of pulses or a variable number of pulses having a fixed or variable duty cycle. For example, the number of pulses and/or duty cycle may be set based on the operating parameters of the power converter. The pulse generator provides the one or more pulses (e.g., a burst of one or more pulses) at an output 314 that is supplied to output logic. For example, the burst of one or more pulses at 314 to an input of a NOR-gate 320. The start signal at 306 is applied to another input of the NOR-gate 320 and the combined result (e.g., by logical NORing) provides a pulse output signal that is applied to an input of the gate driver (e.g., driver 112) for controlling power switch devices of a switch circuit (e.g., switch circuit 114).

FIG. 4 is a signal diagram illustrating signals associated with operation of the auxiliary control loop (e.g., loop 102 of FIG. 1 or 300 of FIG. 3) in combination with certain signals of a power converter employing the auxiliary control loop. The signal diagram 400 includes a FORCE_SWITCHING signal 402 corresponding to the output of the watchdog timer 304 that is operative to enable switching while the PAUSE signal is still at a logic high. The diagram 400 also illustrates a PAUSE signal 404, a PULSE signal (e.g., pulse signal 111 in FIG. 1) as well as inductor current (IL) signal at 406 and the output voltage (VOUT) at 408. The combination of the FORCE_SWITCHING signal 402 and the PAUSE signal 404 being high results in the pulse generator providing the PULSE signal 405, which may include one or more pulses. The PULSE signal 405 is used to drive the switch circuit to provide negative bursts of the inductor current 406, as shown at 410. By way of example, the FORCE_SWITCHING signal 402 goes logic high as soon as the watchdog timer expires and it remains logic high for a predetermined duration, demonstrated as pulse width 403. The FORCE_SWITCHING signal 402 could be generated either in the watchdog itself or at the boundary of main control loop and watchdog. When the FORCE_SWITCHING is logic high and the PAUSE signal is logic high, pulse generator is activated to generate the PULSE signal 405 having one or more pulses. In the example of FIG. 4, the pulse generator provides the PULSE signal 405 with four pulses when the FORCE_SWITCHING and PAUSE signals are both logic high. In another example, a different number of pulses may be used to provide the PULSE signal 405, as disclosed herein. The PULSE signal 405 controls the converter to first switch with one or more negative pulses 410 of inductor current and then switch to natural switching shown at 414. During the negative bursts of inductor current 410, the output voltage 408 decreases accordingly, as shown at 415. In response to the output voltage decreasing by a sufficient amount, the main control loop takes over to exit the skip mode and resume switching to regulate the output voltage VOUT to the target. Thus, the PAUSE signal is deasserted low, as shown at 412, when switching is resumed. In response, the main control loop controls the switch devices of the converter to apply a burst of positive inductor current, demonstrated at 414. As shown, the output voltage increases and is regulated accordingly to the target voltage, at which time the FORCE_SWITCHING 402 is reset to a logic low, as shown at 416. When the FORCE_SWITCHING signal goes logic low, at 416, the main loop is configured to enter the skip state naturally and the PAUSE signal goes logic high due to the output voltage VOUT increasing beyond the target voltage to which it is being regulated. The PAUSE signal 404 is asserted to a logic high when switching is terminated to trigger the watchdog timer 304 to repeat the out-of-audio control.

Figure 5A:
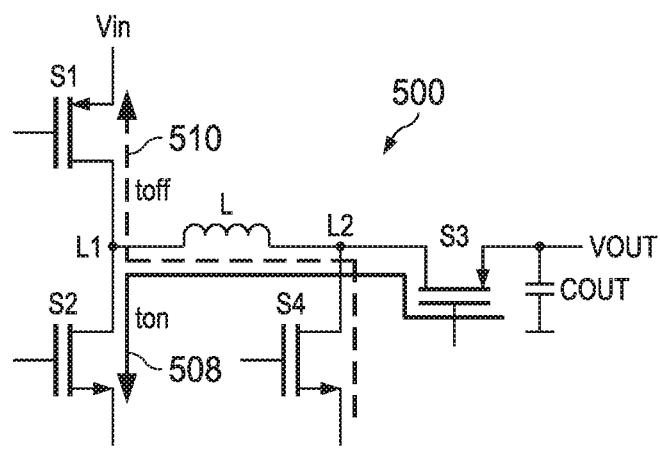
FIG. 5A depicts an example of a buck-boost converter.
Figure 5B:
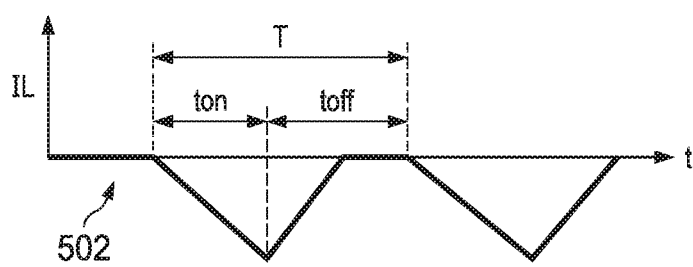
FIG. 5B is a plot showing negative inductor current applied by the converter of FIG. 5A during out-of-audio switching.

FIG. 5A illustrates an example of a buck-boost converter 500. FIG. 5B is a plot of inductor current, demonstrated at 502, that occurs during the negative burst of inductor current for the converter 500. In this example, the buck-boost converter 500 includes a first switch device S1 coupled between an input voltage VIN and an inductor terminal node L1. A second switch device S2 is coupled between the inductor terminal L1 and electrical ground. A third switch device is coupled between an output voltage VOUT and a second inductor node L2. A fourth switch device S4 is coupled between the inductor node L2 and electrical ground. In this example an output capacitor COUT is coupled between the output voltage VOUT and electrical ground.

As disclosed herein, an auxiliary control loop, such as may be implemented as control loop 102 or 300, is configured to control the switch devices S1, S2, S3 and S4 to implement out-of-audio control. For example, the auxiliary control loop controls the switch devices S1, S2, S3 and S4 to provide one or more negative bursts of inductor current so that a net positive charge does not accumulate on the output capacitor COUT.

As shown in the plot 502 of FIG. 5B, during an ON period (TON), such as occurs when PULSE signal 111 or 405 is logic high, current switch devices S2 and S3 are turned on and current flows along current path 508 from the output through S3 through the inductor between L2 and L1 and through switch S2. During the TON interval, S1 and S4 are turned off. During a second phase of the negative bursts, demonstrated as TOFF, such as occurs when the PULSE signal 111 or 405 is logic low, S1, S2, S3 and S4 are all turned off. Thus, during TOFF, the inductor current continues to flow, but from ground through back-gate diode of S4, through the inductor (from L2 to L1) and through the back-gate diode of S1 to return energy to VIN. In an example, to ensure that negative current does not build up from cycle to cycle for the converter 500, TON may be set as follows:

$$TON<(VIN+2*Vd)/(VIN+VOUT+2*Vd)*T$$

where: Vd denotes the back-gate diode voltage (e.g., Vd≈0.7V), and

T denotes the period of pulses (T=TON+TOFF).

The above formula used to set TON may vary based on the type of converter used.

Thus, by tri-stating both the buck and boost power stages of the converter 500, stored energy from COUT is transferred to the inductor (during TON) which is then returned to the input voltage (during TOFF) through respective back-gate diodes shown as current path 510. In some examples, the TON and TOFF phases of each pulse may be repeated over a number of pulses according to the number of one or more pulses generated (e.g., by pulse generator 110 or 312). Accordingly, during each TON phase, the output voltage VOUT is discharged through the path 508 to provide negative current through the inductor L. During $T_{OFF}$ phase, the switches S1, S2, S3 and S4 are turned off and the negative current continues to flow through the inductor L from ground to the input voltage VIN according to the energy stored in the inductor during TON.

Figure 6:
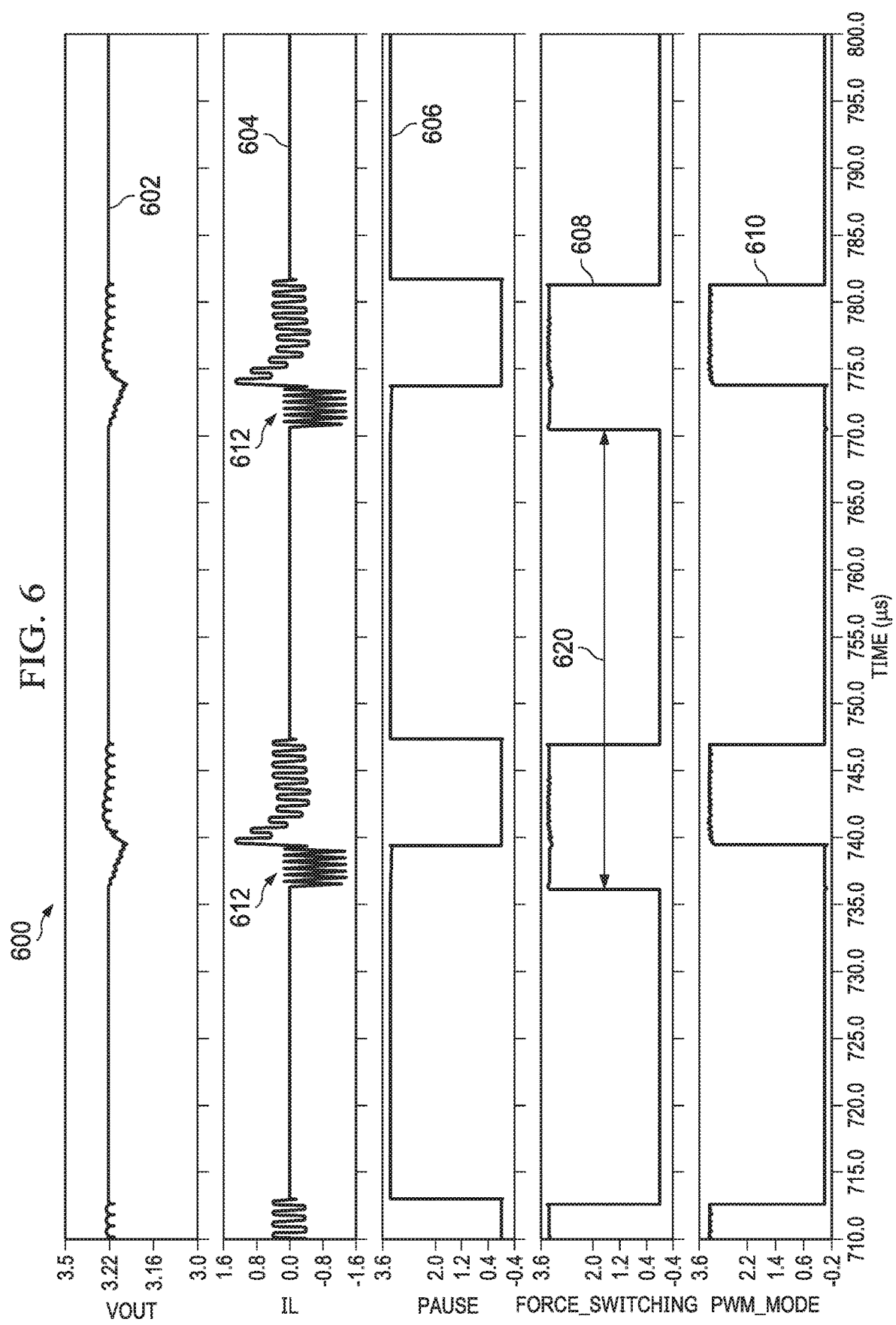
FIG. 6 depicts a signal diagram illustrating an example of control signals for operating a buck-boost converter.

FIG. 6 is a signal diagram that includes signals from the buck-boost converter 500 of FIG. 5A as well as corresponding signals associated with operation of an auxiliary control loop (e.g., control loop 102 or 300) as disclosed herein. The signal diagram 600 thus includes an output voltage (VOUT) 602, inductor current (IL) 604, the PAUSE signals 606, a FORCE_SWITCHING signal 608 and a PWM_MODE signal 610. For example, the output voltage signal 602 corresponds to VOUT in FIG. 5A and inductor current 604 corresponds to current between L1 and L2 such as shown at 510 and 508 during the TON and TOFF phases during the negative current bursts.

As shown in FIG. 6, the PAUSE signal is an inverted version of the PWM_MODE signal 610. Thus, when the PWM_MODE signal is high, the main control loop implements PWM switching for the power converter 500. As shown in FIG. 6, negative bursts of current are applied to the inductor at the beginning of each switching burst phase based on the AND-ing of the FORCE_SWITCHING and PAUSE signals 608 and 606, respectively. This results in negative pulses of the inductor current 604, demonstrated at 612. As disclosed herein, the negative inductor current results in a corresponding decrease in the output voltage 602 (by discharging output capacitor COUT) until the main control loop detects the output voltage to be less than a target voltage. Based on comparing the output voltage and target voltage, the main control loop deasserts the PAUSE signal and asserts the PWM_MODE signal to result in entering a PWM mode for continuous switching for to provide positive current pulses through inductor for regulating the output voltage to the desired target voltage. When the output voltage is regulated, the main control loop asserts the PAUSE signal (to logic high) and deasserts the PWM_MODE signal (to logic low). As described herein, the time interval between the FORCE_SWITCHING signal going high, demonstrated at 620, is controlled by the watchdog circuit to be less than the audible duration for the converter 500. In this way, audible switching noise may be prevented during operation of the power converter including when operating in a power save mode. Additionally, by decreasing the output voltage through inductively discharging the output voltage, the power converter can naturally exit the skip mode.

Figure 7A:
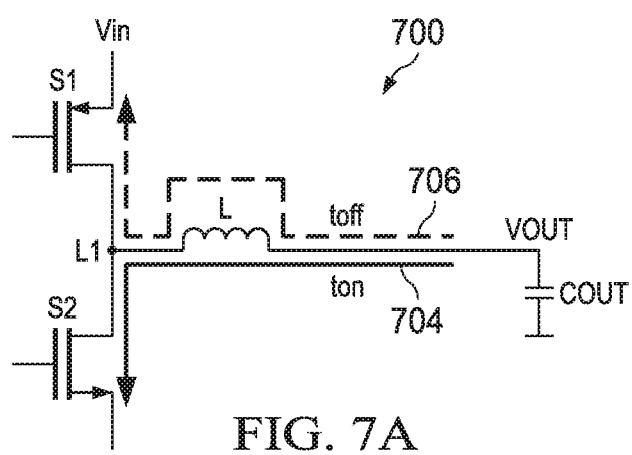
FIG. 7A depicts an example of a buck converter.
Figure 7B:
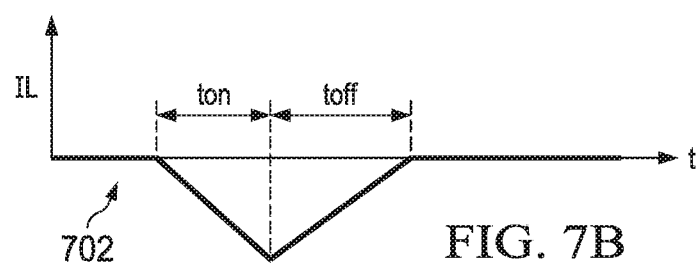
FIG. 7B is a plot showing negative inductor current applied by the converter of FIG. 7A during out-of-audio switching.

FIG. 7A depicts an example of a buck converter 700 that may implement an out-of-audio control scheme. FIG. 7B is a plot of inductor current, demonstrated at 502, that occurs during the negative burst of inductor current for the buck converter 700. The buck converter 700 includes switch S1 coupled between an input voltage VIN and an inductor terminal L1. Another switch device S2 is coupled between inductor terminal L1 and electrical ground. An inductor is coupled between inductor terminal L1 and an output of the converter 700 corresponding to output voltage VOUT. An output capacitor COUT is coupled between the output of the converter and electrical ground.

As an example, the auxiliary control loop, such may be implemented by control loop 102 or 300, is configured to operate the power converter 700 to prevent audible switching noise. As disclosed herein, the out-of-audio control is achieved by applying a negative burst of current through the inductor L1 for discharging the output voltage VOUT at a rate that repeats with a frequency outside of the audible range of the converter 700. Referring to FIG. 7B, during an on phase (TON) of the negative burst, such as occurs when the PULSE signal 111 or 405 is logic high, switch device S1 is turned off and switch S2 is turned on such that current flows along a current path 704 that goes from the output VOUT through the inductor L, the inductor terminal L1, and through switch S2 to ground. This negative current through the inductor L stores energy in the inductor. Therefore, during a next phase of the pulse (TOFF), such as occurs when the PULSE signal 111 or 405 is logic low, current flows along path 706 through the back-gate diode of S1 while both switches S1 and S2 are turned off. That is, the current flows along the path 706 from the output VOUT through inductor L1 and through the back-gate diode of switch device S1 to return energy to the input voltage VIN. As disclosed herein, the negative discharge burst that is generated by the auxiliary control loop may include a single pulse or multiple pulses. Each pulse including a TON and a TOFF phase, such as disclosed herein FIG. 8 is a signal diagram demonstrating signals in the buck converter 700 of FIG. 7A associated with implementing out-of-audio switching. The signal diagram 800 includes inductor current (IL) 802, output voltage (VOUT) 804 and switch voltage (VSW) 806, which corresponds to the voltage at node L1 of FIG. 7A. As disclosed herein, the negative current pulse 808 is applied at a frequency to ensure that the switching is out of the audio range. In the example of FIG. 8, a first single negative current pulse 808 is applied at the beginning of a burst and a second negative pulse 810 is applied within a duration of the first pulse to ensure that switching remains out of audio. After the second negative pulse 810, the output voltage VOUT at 804 goes to the threshold of the comparator (e.g., about 1.5 V) to take the power converter out of the skip mode and into the PWM switching mode. The main control loop controls the operation of the switches S1 and S2 during the PWM switching mode to apply positive current to the output voltage for charging the capacitor COUT. FIG. 8 provides an example where only a single negative pulse is used, such as by the pulse generator 110 or 312 providing a single PULSE signal.

Figure 9:
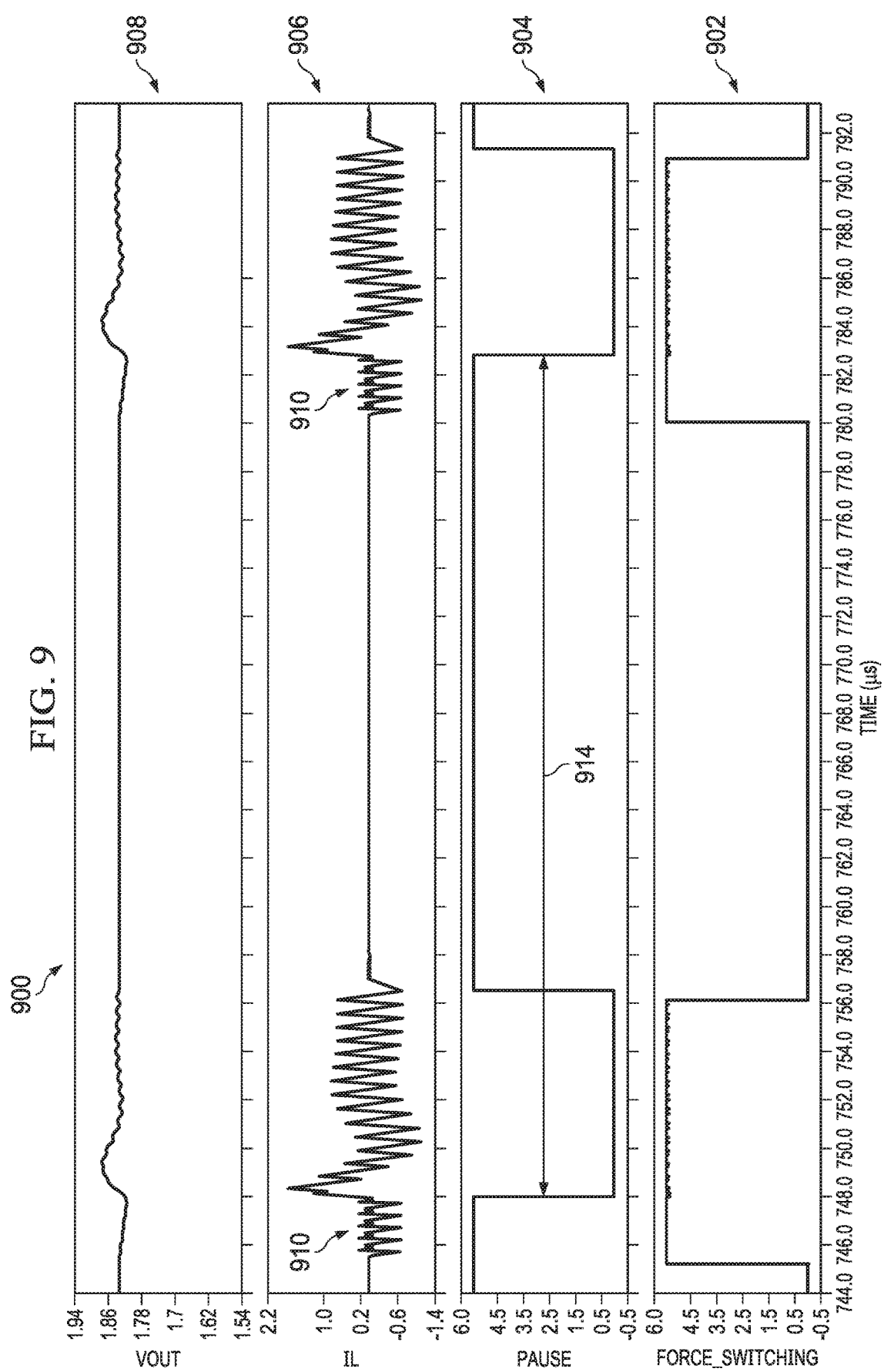
FIG. 9 is another signal diagram illustrating signals associated with control of the buck converter of FIG. 7A during out-of-audio switching.

FIG. 9 is a signal diagram 900 demonstrating another example of the operation of the buck converter 700 of FIG. 7A implementing out-of-audio control. In the example of FIG. 9, multiple negative pulses are applied to drive switches with a duty cycle and each pulse including a TON phase and TOFF phase as disclosed with respect to FIG. 7B. In FIG. 9, the signal diagram 900 includes a FORCE_SWITCHING signal 902, a PAUSE signal 904, an inductor current signal (IL) 906 and an output voltage (VOUT) 908. As disclosed herein, the watchdog circuit (e.g., circuit 104 or 301) initiates the start of negative current bursts 910 based on the FORCE_SWITCHING and PAUSE signals being high. In this example, the negative current burst 910 of the inductor current 906 includes a plurality (e.g., four) pulses at the beginning of each negative burst, such as generated based on the PULSE signal generated by pulse generator 110 or 312 as a series of respective pulses. The out-of-audio control loop ensures that negative pulses are applied in each burst to discharge the output voltage VOUT (e.g., by controlling switches S1 and S2 as described with respect to FIG. 7) before charging the output voltage VOUT according to the target. The out-of-audio control loop thus maintains the period of each PAUSE signal, demonstrated at 914, to remain within an out-of-audio duration (e.g., less than 50 microseconds). The negative inductor current IL applied during the negative burst 910 thus decreases the output voltage VOUT shown at 908 commensurate with the negative inductor current 910. In response to the output voltage dropping below the target voltage, the main control loop is configured to utilize PWM switching to regulate the output voltage by applying positive inductor current during the remaining duration of that the FORCE_SWITCHING signal 902 is asserted.

Figure 10:
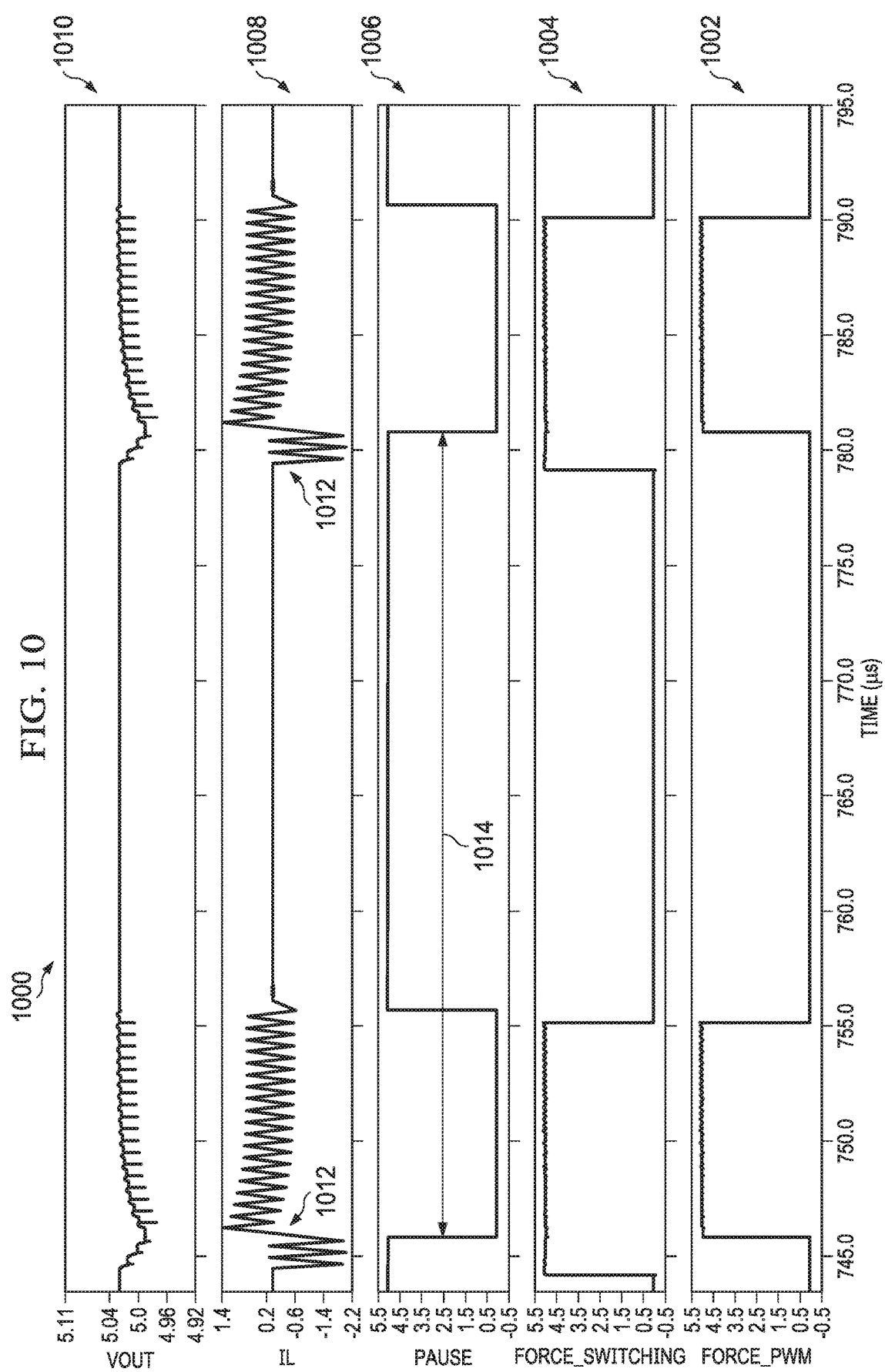
FIG. 10 is a signal diagram illustrating an example of signals associated with operation of a boost converter for performing out-of-audio switching.

As mentioned, the out-of-audio control may be applied to any DC-DC converter (e.g., buck converter, boost converter or buck-boost converter). FIG. 10 depicts an example of a signal diagram 1000 for an example boost converter (not shown). As an example, with reference to the buck-boost converter 500 of FIG. 5, a boost converter may be implemented by permanently shorting S1 and making S2 an open circuit. The signal diagram 1000 includes a FORCE_PWM signal 1002, a FORCE_SWITCHING signal 1004, a PAUSE signal 1006, an inductor current signal (IL) 1008 and an output voltage signal (VOUT) 1010. In the example of FIG. 10, the negative current burst 1012 is applied to the inductor, such as implemented by out-of-audio control loop 102 or 300, based on the FORCE_SWITCHING and PAUSE signals being high to result a corresponding decrease in the output voltage 1010. In this example, the PAUSE signal goes naturally low in response to the main control loop, such as control loop 103, detecting the decrease in the output voltage 1010 with respect to a target voltage. In response, the main control loop of the boost converter asserts the FORCE_PWM signal 1002 high and, in turn, implements PWM switching until the force FORCE_PWM is deasserted. Once switching of the power converter stops, the converter enters the skip mode, as indicated by the PAUSE signal 1006 being asserted to a logic high. The duration between the PAUSE signal going low in sequential cycles is demonstrated at 1014.

Figure 11:
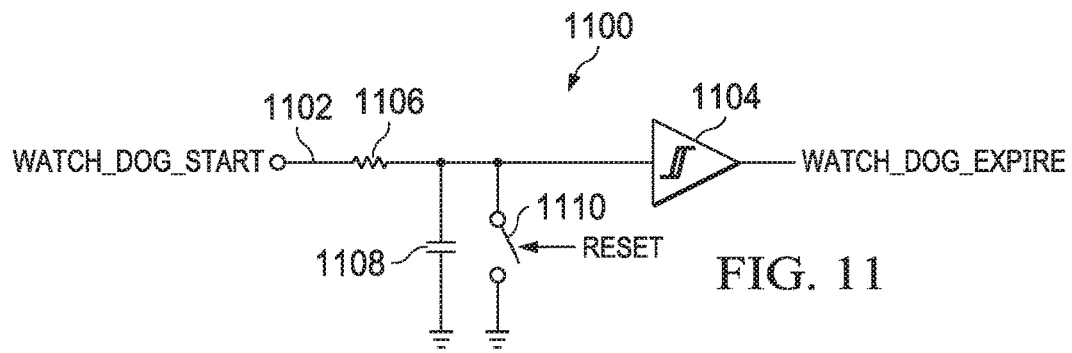
FIG. 11 depicts an example of a watchdog circuit.

FIG. 11 illustrates an example of a watchdog timer circuit 1100 such as may be implemented in the watchdog circuit 104 or as the watchdog timer 304. The watchdog timer circuit 1100 has an input 1102 to receive a start signal, such as corresponding to the PAUSE signal disclosed herein. The PAUSE signal thus can be applied at 1102 for initiating the watchdog timer circuit 1100. The input 1102 is connected to the input of a Schmidt trigger 1104 through a series resister 1106. A capacitor 1108 is connected between the input of the Schmidt trigger 1104 and electrical ground. The resistor 1106 and capacitor 1108 thus form an RC circuit to set the time constant associated with the watchdog timer 1100. Thus, the values of the resistance and capacitance are configurable to set a threshold duration of the timer circuit 1100 as to operate the converter in the out-of-audio range (e.g., less than 50 microseconds between consecutive switching intervals). A switch 1110 is coupled between the input of the Schmidt trigger and electrical ground. A RESET signal may be applied to the switch 1110 to discharge the capacitor periodically, such as at the start of each cycle. Thus the timer circuit 1100 can provide a WATCHDOG_EXPIRE signal indicating when the duration from the start signal at 1102 (e.g., corresponding to the PAUSE signal) has reached the set threshold duration provided by the RC circuit thereof. For example, the WATCHDOG_EXPIRE signal corresponds to the assertion FORCE_SWITCHING signal being asserted to a logic high, as disclosed herein. While the example of FIG. 11 illustrates an analog implementation of the watchdog timer, a corresponding digital implementation may also be utilized, in which a digital counter is clocked according to a clock frequency to set the threshold duration between bursts to operate in the out-of-audio range as disclosed herein.

Figure 12:
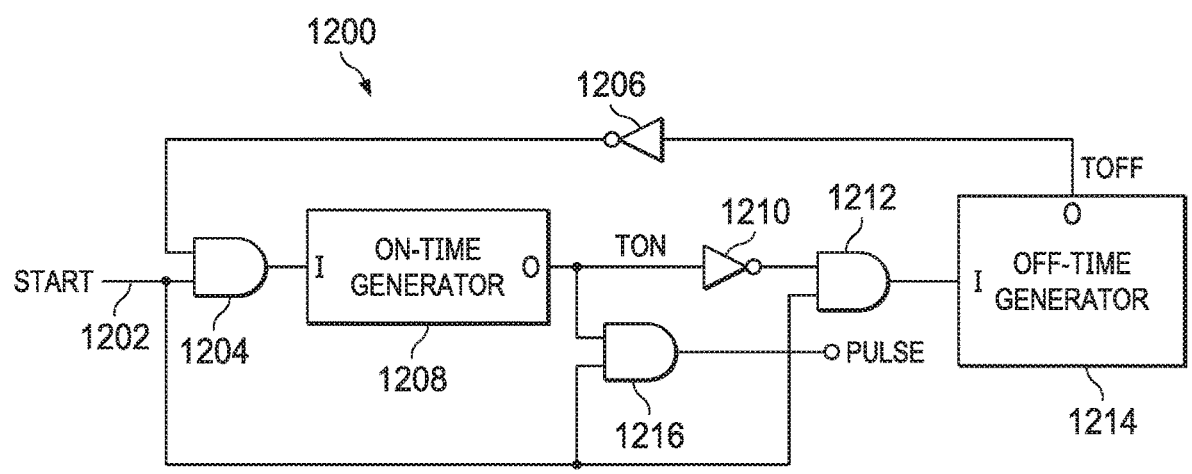
FIG. 12 depicts an example of a pulse generator.
Figure 13:
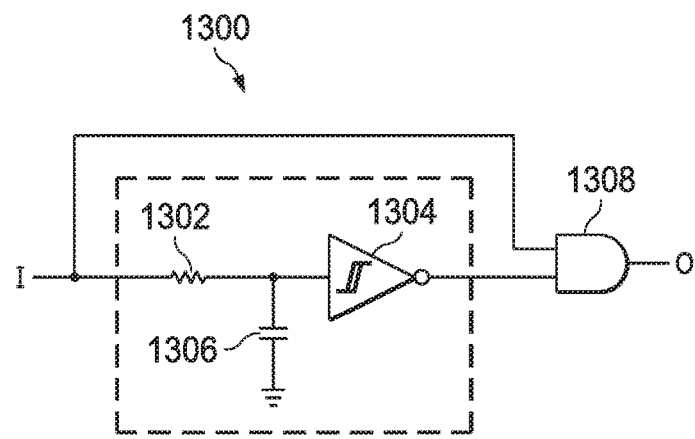
FIG. 13 is an example circuit that may be used to implement on-time generator or off-time generator of FIG. 12.

FIG. 12 depicts an example of a pulse generator 1200, such as may be utilized to implement the pulse generator 110 or 312 disclosed herein. In the example of FIG. 12, the pulse generator 1200 includes an input 1202 to receive a START pulse signal, such as corresponding to the start signal provided by the watchdog circuit 104 or the signal at 310 in FIG. 3. The START signal is provided to an input of an AND-gate 1204. The AND-gate 1204 also receives an input from feedback from the off time (TOFF) of the pulse that is generated by the pulse generator 1200. For example, an output of the pulse generator is applied through an inverter 1206 to the input of the AND-gate. The output of the AND-gate to an input of an on-time generator 1208. The on-time generator provides a TON output signal to an input of an inverter 1210. The inverted turn-on signal is applied to an input of an AND-gate 1212. Another input of the AND-gate 1212 is the START signal provided at the input 1202. The output of the AND-gate 1212 is provided to an input of an off-time generator 1214 that is configured to provide the TOFF signal to the inverter 1206 mentioned above. Another AND-gate 1216 has an input coupled to the output of the on-time generator to receive the TON signal. Another input of AND-gate 1216 is coupled to the START signal provided at 1212. The AND-gate 1216 thus provides a corresponding output PULSE having an on-time and off-time based on the timing configuration of each of the on-time generator 1208 and off-time generator 1214. The output PULSE thus corresponds to the output of the pulse generator 110 or 312 disclosed herein As yet a further example, each of the on time generator and off time generator may be implemented according to the example timing circuit 1300 of FIG. 13. The circuit 1300 is configured to set the timing for the on-time and off-time for each output pulse that is generated by the pulse generator 1200. For example, the circuit 1300 includes a resistor 1302 coupled to an input of a Schmidt trigger 1304. A capacitor 1306 is coupled to a node between the resistor 1302 and Schmidt trigger 1304. The values of the resistor 1302 and capacitor 1306 define an RC time constant that may be set to define the timing of the circuit 1300. The output of the Schmidt trigger is supplied to an input of an AND-gate 1308 to provide a logic output signal based on the output of Schmidt trigger 1304 and the input of the circuit 1300, which is also applied to another input of the AND-gate 1308. In this way, the timing and delay between the input and output of the circuit may be set to achieve desired on and off times of the pulse generator circuit 1200 in FIG. 12.

Figure 14:
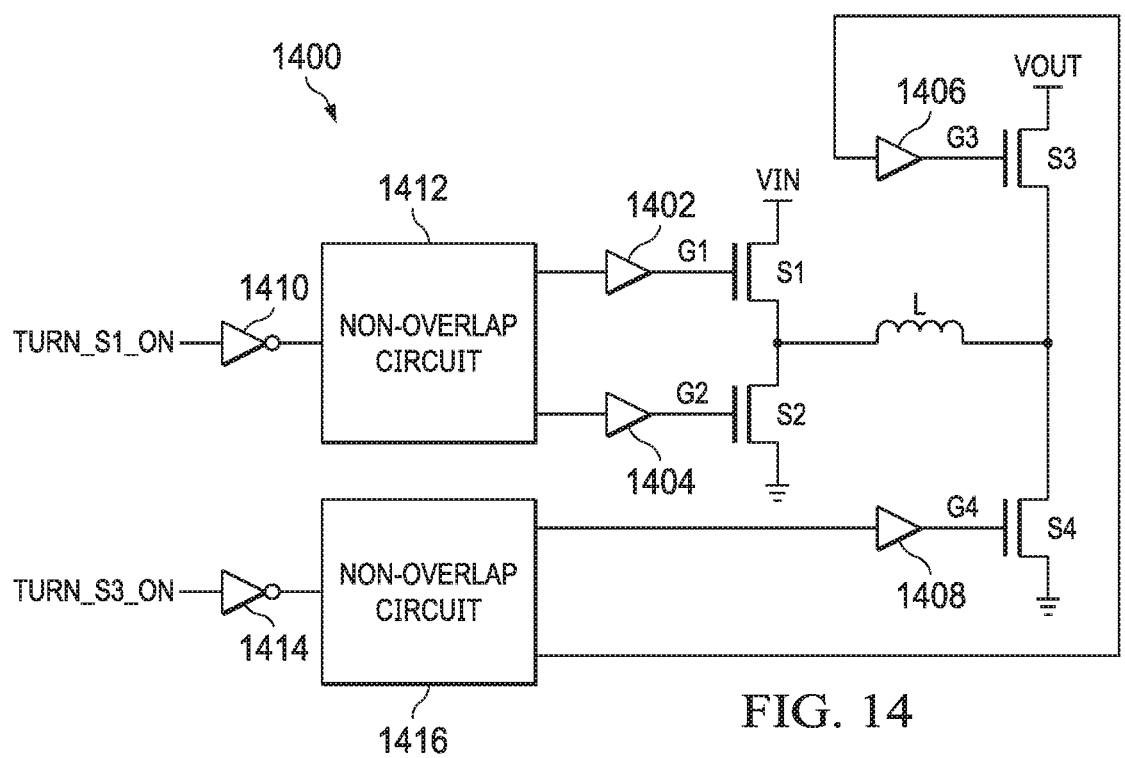
FIG. 14 depicts an example of a gate driver circuit and switches of a converter such as a buck-boost converter.

FIG. 14 depicts an example of gate driver circuit 1400, such as may be implemented as the driver 112, in a buck-boost converter (e.g., corresponding to the converter 500 of FIG. 5). Thus, in this example, the circuit 1400 includes switches S1 and S2 connected between an input voltage VIN and electrical ground. Another set of switches S3 and S4 are connected between VOUT an electrical ground. A node between S1 and S2 corresponds between a first inductor terminal and a node between S3 and S4 corresponds to a second inductor terminal. An inductor L is connected between inductor terminals. In this example each of the switch devices S1, S2, S3 and S4 correspond to field effect transistors; thought other types of transistor devices may be used in other examples. A corresponding driver 1402, 1404, 1406 and 1408 is coupled to a gate G1, G2, G3 and G4 of each of the respective switch devices. For example, each of the drivers 1402, 1404, 1406 and 1408 may be implemented as high strength digital drivers to provide respective pulses to control the gates of each of the switch devices during switching operations for the negative burst and positive switching modes. A turn-on signal for switch device S1 is applied to an input of an inverter 1410. The inverted turn-on S1 signal is applied to a non-overlap circuit 1412 to provide corresponding control signals to each of the gate drivers 1402 and 1404 respectively. The non-overlap circuit is configured to ensure that each of the switch devices S1 and S2 operate in a mutually exclusive manner, such that they are not both turned on simultaneously. Similarly, a turn-on S3 signal is applied to an inverter 1414 and the inverted signal is applied to another non-overlap circuit 1416. The non-overlap circuit 1416 is coupled to each of the respective drivers 1406 and 1408 and is configured to ensure that operation of switch devices S3 and S4 are not both turned on simultaneously. As an example, the non-overlap circuits 1412 and 1416 may be implemented as cross-coupled logic that includes an arrangement of NAND or NOR gates configured to provide the respective non-overlapping turn-on and turn-off signals. Other types of circuitry, such as anti-cross conduction circuits, may be utilized to implement the non-overlap circuits 1412 and 1416 to ensure the mutually exclusive operation of the switches S1 and S2 as well as S3 and S4.

Figure 15:
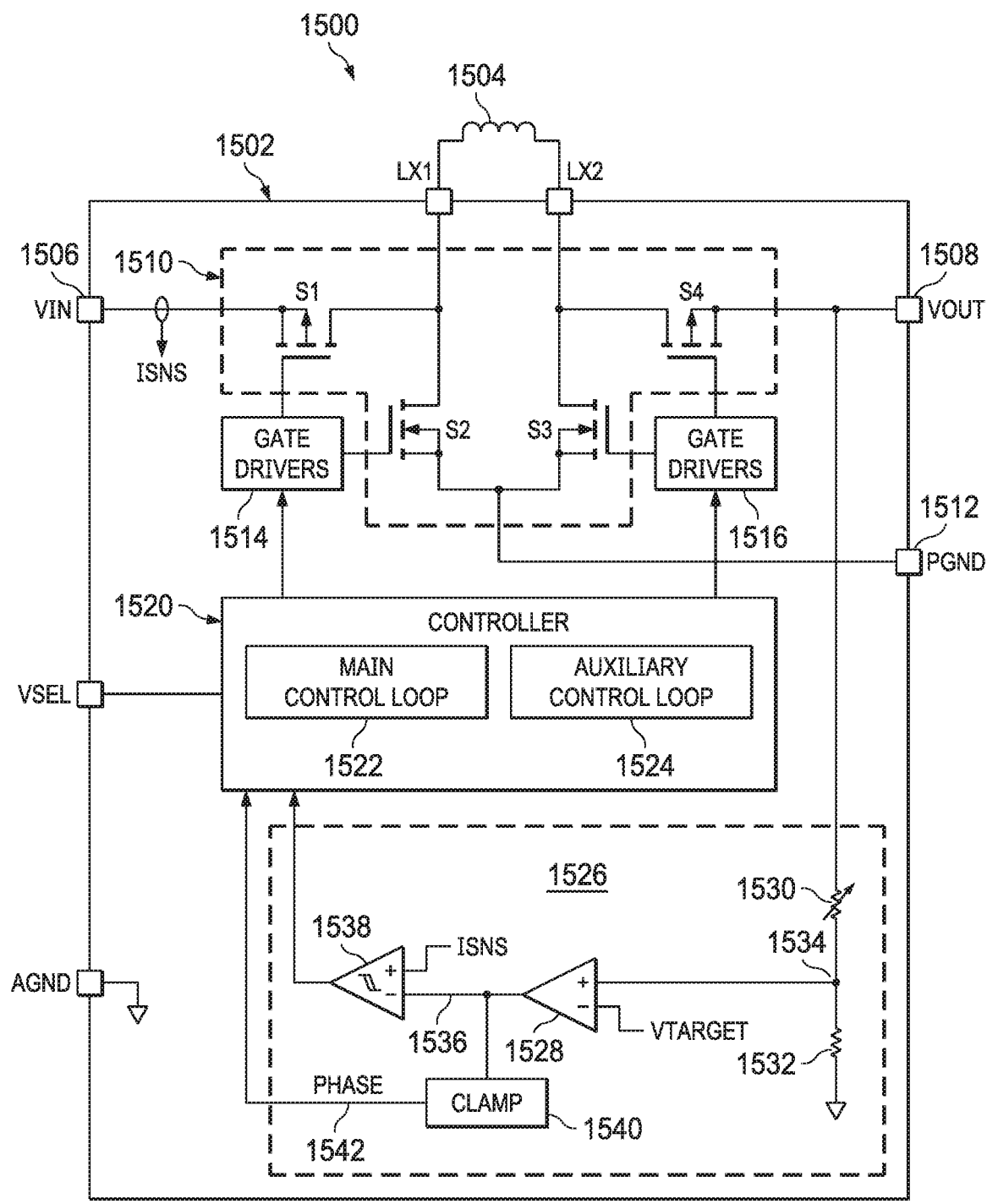
FIG. 15 depicts an example of an integrated circuit for a power converter that may implement out-of-audio control.

FIG. 15 depicts an example of power converter 1500 that may implement out-of-audio control. In the example of FIG. 15, the power converter 1500 includes an integrated circuit (IC) chip 1502 that is configured as a buck-boost power converter. The converter may similarly be used to implement other types of power converters disclosed herein (e.g., boost or buck converters). The power converter 1500 includes an external inductor 1504 coupled between inductor terminals LX1 and LX2 of the IC chip 1502. The IC chip 1502 also includes an input terminal 1506 adapted to be coupled to an input voltage VIN and an output terminal 1508 adapted to be coupled to an output voltage VOUT. For example, an output capacitor is coupled to the terminal 1508 as part of the power converter 1500.

The IC chip 1502 includes a switch circuit 1510 coupled to the input terminal 1506 and the output terminal 1508. The inductor 1504 is thus located between the switch circuit and the output terminal. In the example of FIG. 15, the switch circuit 1510 includes switch devices S1, S2, S3 and S4. For example, switch devices S1, S2, S3 and S4 are demonstrated as field effect transistors, each having a back-gate diode between the source and drain. In other examples, different types of transistor devices may be used. S1 is coupled between terminal 1506 and LX1. Switch device S2 is coupled between LX1 and a ground terminal 1512. Switch device S2 is coupled between ground terminal 1512 and LX2. Switch device S4 is coupled between LX2 and the output terminal 1508. Gate driver circuitry 1514 is coupled to the gates of S1 and S2, and other gate driver circuitry 1516 is coupled to the gates of S3 and S4. The IC includes a controller 1520 configured to implement control logic.

The controller 1520 includes main control loop circuitry 1522 and auxiliary control loop circuitry 1524. The main control loop circuitry 1522 is configured to control the switch circuit 1510 in a pulse width modulation (PWM) mode to regulate the output voltage VOUT relative to a target voltage (VTARGET). The auxiliary control loop circuitry 1524 is configured to control the switch circuit 1510 to provide a burst of negative current in response to operating in a skip mode for a threshold duration. As disclosed herein, the auxiliary control loop circuitry 1524 controls the threshold duration of the skip mode to be is less than an audio range. The auxiliary control loop circuitry 1524 may be implemented as circuitry 102 or 300 disclosed herein. During the skip mode, for example, the auxiliary control loop circuitry 1524 is configured during the skip mode to supply one or more pulses to the gate drivers to provide the negative burst of current, which flows from the output terminal 1508 through the inductor 1504 to discharge the output voltage VOUT. The main control loop circuitry 1522 is configured to transition from the skip mode to the PWM mode based on the output voltage VOUT and the target voltage VTARGET, such that operation of the switch circuit 1510 remains out of the audio range.

The IC chip 1502 may also include a feedback circuit 1526 configured to provide the controller 1520 feedback based on the output voltage and the target voltage to enable the main and auxiliary control loops to operate as disclosed herein. For example, the feedback circuit 1526 includes an error amplifier 1528 having an input coupled to receive an input corresponding to the output voltage VOUT. In an example, a voltage divider includes resistors 1530 and 1532 coupled between the terminal 1508 and ground. The inverting input is coupled to a node 1534 between resistors 1530 and 1532. The target voltage VTARGET is coupled to non-inverting input. The error amplifier 1528 is configured to compare the divided voltage at 1534 (representing the output voltage VOUT) with the target voltage VTARGET. The error amplifier 1528 is configured to provide an error signal at an output 1536 based on the output voltage VOUT and the target voltage VTARGET. The output 1536 is coupled to an input of a current comparator 1538 and a clamp circuit 1540. A sensed input current ISNS (e.g., from a current sense circuit) is provided to another input of the comparator 1538. The comparator 1538 provides a feedback signal to the controller 1520, which is utilized by the main control loop for regulating the output voltage VOUT at 1508. The clamp circuit 1540 is configured to clamp the error signal at 1536 to generate a PAUSE signal at an output 1542 thereof that is provided to the controller. For example, the PAUSE signal is provided to the main and auxiliary control loops 1522 and 1524 and is used to specify when the converter is operating in the skip mode, as disclosed herein. Thus, the main control loop is configured to control the switch circuit 1510 to enter the pulse width modulation operating mode and supply the positive current based on the PAUSE signal having a logic low value. For example, the clamp circuit 1540 provides the PAUSE signal having logic low value based on the error signal at 1536 indicating that the output voltage is less than a target voltage, such that the main control loop can control the switch circuit 1510 to provide current to the output 1508 for charging the output capacitor as disclosed herein.

Figure 16:
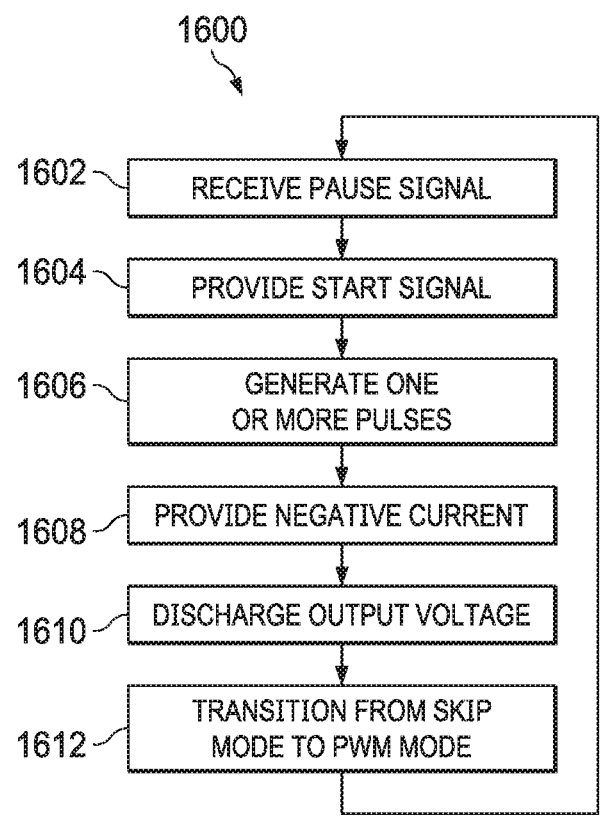
FIG. 16 is a flow diagram illustrating an example method of operating a power converter in an out-of-audio range.

FIG. 16 is a flow diagram illustrating an example method 1600 of operating a power converter in an out-of-audio range. The method may be implemented by a control loop and other circuitry disclosed herein (see, e.g., FIGS. 1, 3, 5, 7 and 15). In an example, the method 1600 may be utilized during a power save mode, such as during a light or no load condition. At 1602, a pause signal is received (e.g., at an input of watchdog circuit 104, 301 of an auxiliary control loop 102, 300, 1524). The pause signal has a state indicating operation in a skip mode in which a switch circuit (e.g., switch circuit 114, S1, S2, S3, S4, 1500) of the power converter has stopped switching in a pulse width modulation (PWM) mode. The configuration of the switch circuit may vary according to the type of power converter being implemented. For example, the pause signal can be asserted by a main control loop or other circuitry to indicate the power converter is operating in a skip mode.

At 1604, a start signal is provided, such as implemented by watchdog circuit 104, 301, based on the pause signal in response to detecting that the switch circuit has stopped switching for a threshold duration (e.g., about 40 microseconds or less). For example, the duration can be tracked by a watchdog timer (e.g., timer 304 or 1100) of the watchdog circuit and used to provide the start signal. As an example, the start signal is triggered to ensure that a duration between adjacent switching cycles do not exceed a threshold duration that would operate the switch circuit in the audible range. As disclosed herein, the start signal may be provided based on the force switching signal and the pause signal (e.g., by NAND-gate 302 ANDing the force switching signal and the pause signal).

At 1606, at least one pulse is generated, such as by pulse generator 110, 312, 1200, during the skip mode based on the start signal. As disclosed herein, the number and/or width of pulses may vary according to application requirements. For example, during the skip mode, the pulse generator is configured to generate the one or more pulse at 1606 as a predetermined number of pulses generated based on the start signal, a variable number of pulses generated based on the start signal or a number of one or more pulses controlled based on the output voltage relative to the target voltage (e.g. controlled based on the error signal at 1536).

At 1608, negative current (e.g., a negative current burst) is provided from an output of the power converter through an inductor based on the at least one pulse. For example, an auxiliary control loop, such as implemented by control loop 102, 300, 1524, is configured to control a switch circuit (e.g., circuit 114, S1, S2, S3, S4, 1500) based on the one or more pulses to provide one or more pulses of negative inductor current. At 1610, the output voltage is discharged based on the negative current. For example, the negative current is pulled from the output through the inductor and to ground during a first phase of a given pulse and then the current is returned to the input voltage during a second phase of the given pulse, such as disclosed herein (e.g., by controlling one or more switch devices). At 1612, the method transitions the power converter from the skip mode to the PWM operating mode based on the output voltage and the target voltage. For example, the negative current operates to discharge the output voltage (e.g., stored in an output capacitor COUT) to a level that is below a target voltage, and the main control loop, such as implemented by loop 103 or 1522, is configured to enter the PWM mode and control switching to provide positive inductor current (e.g., by operating of the switch circuit in the PWM mode) to regulate the output voltage with respect to the target voltage. In this way, the method maintains operation of the switch circuit out of an audible range.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims. Additionally, where the disclosure or claims recite "a," "an," "a first," or "another" element, or the equivalent thereof, it should be interpreted to include one or more than one such element, neither requiring nor excluding two or more such elements. As used herein, the term "includes" means includes but not limited to, and the term "including" means including but not limited to. The term "based on" means based at least in part on.

What is claimed is:

1. A power converter comprising:
    a watchdog circuit having an input adapted to be coupled to a pause signal of a switching power supply, the watchdog circuit configured to provide a start signal at an output thereof based on the pause signal indicating that the power converter has stopped switching for a threshold duration that is less than an audible switching range of the power converter;
    a pulse generator circuit having an input coupled to the output of the watchdog circuit and configured to generate at least one pulse based on the start signal; and
    a switch circuit having an input terminal adapted to be coupled to an input voltage and at least one other terminal adapted to be coupled to an inductor, the switch circuit configured to provide negative current from an output of the power converter through the at least one other terminal based on the at least one pulse.

2. The power converter of claim 1, further comprising a driver circuit coupled between the pulse generator circuit and the switch circuit, outputs of the driver circuit coupled to control inputs of respective switches of the switch circuit.

3. The power converter of claim 1, wherein the pulse generator circuit is configured to provide a predetermined number of pulses based on the start signal.

4. The power converter of claim 1, wherein the pulse generator circuit is configured to provide a variable number of pulses based on the start signal.

5. The power converter of claim 1, wherein the pulse generator circuit is configured to control the at least one pulse based on an output voltage at the output of the power converter relative to a target output voltage.

6. The power converter of claim 1, wherein the pulse generator circuit is configured to generate the at least one pulse as a plurality of pulses having a predetermined duty cycle.

7. The power converter of claim 1, wherein the watchdog circuit comprises:
    a timer configured to generate a force switching signal based on operating in a skip mode for the threshold duration; and
    logic circuit configured to provide the start signal based on the force switching signal and the pause signal.

8. The power converter of claim 7, wherein the threshold duration of the skip mode is less than about 40 microseconds.

9. The power converter of claim 7, wherein the watchdog circuit and pulse generator define at least a portion of an auxiliary control loop, the power converter further comprising a main control loop configured to control the switch circuit in a pulse width modulation operating mode based on an output voltage of the power converter relative to a target voltage, the main control loop also configured to control the switch circuit to provide positive current to the output during the pulse width modulation operating mode.

10. The power converter of claim 9, further comprising:
a feedback circuit configured to provide an error signal based on the output voltage of the power converter relative to the target voltage, wherein the pause signal is generated based on the error signal; and
control logic configured to control the switch circuit to enter the pulse width modulation operating mode and supply the positive current based on the pause signal having a state indicating that the output voltage is less than the target voltage.

11. The power converter of claim 9, further comprising a clamp circuit configured to set a state of the pause signal based on the output voltage relative to the target voltage.

12. The power converter of claim 1, wherein the power converter is configured as one of a buck converter, a boost converter or a buck-boost converter.

13. A system, comprising:
a switch circuit having an input terminal and an output terminal, the input terminal coupled to an input voltage and the output terminal coupled to an output voltage of the system;
main control loop circuitry configured to control the switch circuit in a pulse width modulation (PWM) mode to regulate the output voltage relative to a target voltage; and
auxiliary control loop circuitry configured to control the switch circuit to provide negative current in response to operating in a skip mode when switching is paused for a threshold duration, which is less than a duration to operate the switch circuit in an audible range, the negative current to flow from the output terminal through an inductor to discharge the output voltage, the main control loop circuitry configured to transition from the skip mode to the PWM mode based on the output voltage and the target voltage to maintain operation of the switch circuit out of the audible range.

14. The system of claim 13, wherein the auxiliary control loop circuitry comprises:
a watchdog circuit configured to provide a start signal based on a pause signal indicating that the switch circuit has stopped switching in the PWM mode and has operated in the skip mode for the threshold duration; and
a pulse generator circuit configured to generate at least one pulse based on the start signal, the negative current being provided based on the at least one pulse.

15. The system of claim 14, wherein the watchdog circuit comprises:
a timer configured to generate a force switching signal based on operating in the skip mode for the threshold duration, which is sufficient to maintain switching by the switch circuit out of the audible range; and
logic configured to provide the start signal based on the force switching signal and the pause signal.

16. The system of claim 15, wherein the threshold duration of the skip mode sufficient to maintain switching by the switch circuit out of the audible range is less than about 40 microseconds.

17. The system of claim 14, wherein the pulse generator circuit is configured to one of provide a predetermined number of pulses based on the start signal, provide a variable number of pulses based on the start signal or control pulses based on the output voltage of the relative to the target voltage.

18. The system of claim 13, wherein the main control loop circuitry, the auxiliary control loop circuitry and the switch circuit are implemented in an integrated circuit chip.

19. The system of claim 13, further comprising the inductor coupled to the at least one inductor terminal between the switch circuit and the output terminal.

20. A method comprising:
receiving a pause signal having a state indicating operation in a skip mode in which a switch circuit of a power converter has stopped switching in a pulse width modulation (PWM) mode;
providing a start signal based on the pause signal in response to detecting that the switch circuit has stopped switching for a threshold duration;
generating at least one pulse during the skip mode based on the start signal; and
providing a negative current from an output of the power converter through an inductor based on the at least one pulse;
discharging an output voltage at the output of the power converter based on the negative current; and
transitioning from the skip mode to the PWM mode based on the output voltage and a target voltage to maintain operation of the switch circuit out of an audible range of the switch circuit.

21. The method of claim 20, wherein providing the start signal comprises:
generating a force switching signal based on operating in the skip mode for the threshold duration; and
provide the start signal based on the force switching signal and the pause signal.

22. The method of claim 20, wherein the at least one pulse during the skip mode comprises one of a predetermined number of pulses generated based on the start signal, a variable number of pulses generated based on the start signal or a number of one or more pulses controlled based on the output voltage relative to the target voltage.

* * * * *